United States Patent [19]
Ikada et al.

[11] Patent Number: 6,007,723
[45] Date of Patent: Dec. 28, 1999

[54] APPARATUS FOR PROCESSING FLUID AND METHOD FOR PRODUCING SEPARATED FLUID

[75] Inventors: Hiroyuki Ikada, Chiba; Takao Tanno, Kyoto; Hiromu Takeuchi, Kanagawa, all of Japan

[73] Assignee: Toray Industries, Inc., Japan

[21] Appl. No.: 08/776,858

[22] PCT Filed: Jun. 13, 1996

[86] PCT No.: PCT/JP96/01607

§ 371 Date: Mar. 12, 1997

§ 102(e) Date: Mar. 12, 1997

[87] PCT Pub. No.: WO97/00120

PCT Pub. Date: Jan. 3, 1997

[30] Foreign Application Priority Data

Jun. 15, 1995 [JP] Japan ................................ 7-149190

[51] Int. Cl.[6] .......................... B01D 61/00; B01D 63/00
[52] U.S. Cl. .................... 210/650; 210/330; 210/340; 210/321.74; 210/321.83; 210/456
[58] Field of Search ................................ 210/650, 330, 210/340, 321.74, 493.4, 321.83, 456, 321.78, 321.8

[56] References Cited

U.S. PATENT DOCUMENTS

| | | | |
|---|---|---|---|
| 3,880,755 | 4/1975 | Thomas et al. | 210/321.83 |
| 4,070,280 | 1/1978 | Bray | 210/450 |
| 4,083,780 | 4/1978 | Call | 210/321.83 |
| 4,476,015 | 10/1984 | Schmitt | 210/321.83 |
| 4,632,756 | 12/1986 | Coplan et al. | 210/321.88 |

FOREIGN PATENT DOCUMENTS

| | | |
|---|---|---|
| 0472264A2 | 2/1992 | European Pat. Off. . |
| 3916744A1 | 12/1990 | Germany . |
| 427179 | 6/1967 | Italy . |
| 2 254 799 | 10/1992 | United Kingdom . |
| 84102486 | 5/1984 | WIPO . |

Primary Examiner—Ana Fortuna
Attorney, Agent, or Firm—Austin R. Miller

[57] ABSTRACT

The present invention relates to an apparatus for processing fluid for separating any component mixed or dissolved in a fluid and a method for producing a separated fluid. The present invention provides an apparatus for processing fluid which does not require any complicated manifolds in such a way that a plurality of cylindrical vessels each having a plurality of flow ports on the outer peripheral surface thereof at positions near both ends thereof, respectively, and incorporating therein a series of separating elements are arranged substantially parallel to one another with the flow ports of the adjoining cylindrical vessels held connected face-to-face with each other. Further, a method for producing separated fluid at a low cost can be provided by using the above-described apparatus for processing fluid.

15 Claims, 10 Drawing Sheets

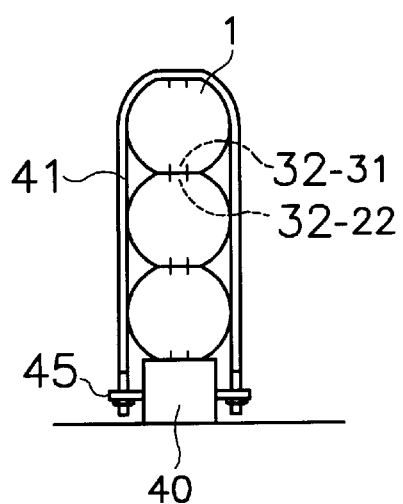
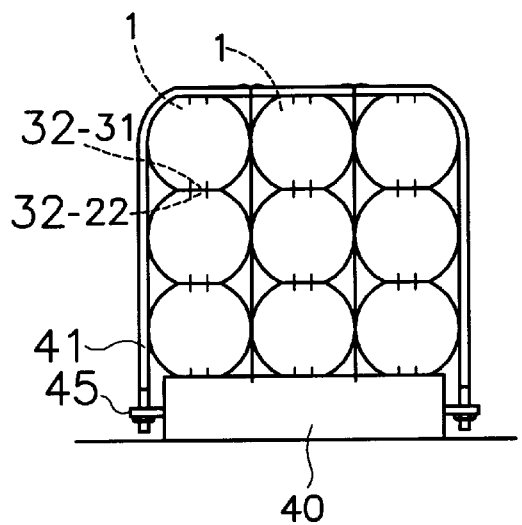
Fig. 4A
Fig. 4B

APPARATUS FOR PROCESSING FLUID AND METHOD FOR PRODUCING SEPARATED FLUID

TECHNICAL FIELD

The present invention relates to an apparatus for processing fluid and a method for producing a separated fluid.

BACKGROUND ART

Conventionally, a fluid processing apparatus for seawater desalination, etc. has been constructed such that as shown in FIG. 7, a plurality of unitary modules 10 each comprising a cylindrical vessel 1 incorporating therein a plurality of separating elements 2 each comprised of a piece of reverse osmosis membrane (permeable membrane). The separating element 2 is formed by spirally winding a piece of permeable membrane around a central pipe 11 through a spacer. Thus, when seawater is supplied under pressure from a supply pipe 12 into the unitary module 10, the seawater is desalted through the separating element 2 in each stage and the low-pressure fresh water after desalination is discharged from a discharge pipe 13 through the central pipe 11 while high-pressure concentrated water is discharged from a discharge pipe 14.

That is, the cylindrical vessel is divided into a high-pressure space where high-pressure seawater and concentrated water are present and a low-pressure space where the low-pressure fresh water is present, through the permeable membrane of each of the separating elements 2.

However, the conventional fluid processing apparatus has generally been constructed such that as shown in FIG. 8, a plurality of unitary modules 10 are fixedly arranged horizontally on frames 20 and supply pipes 12 and discharge pipes 13, 14 which respectively extend from both side ends of the unitary modules 10 are collected into a manifold 22 and manifolds 23, 24.

However, there has arisen the problem that since the installation of the frames 20 and the piping operation for connecting the manifolds 22, 23 and 24 at the working site are extremely complicated, the cost required for these operations becomes higher than the cost of the apparatus itself. Further, there has also arisen the problem that if the manifolds 22, 23 and 24 are attached to both ends of the unitary modules 10, the manifolds are required to be dismantled or assembled every time when each of the separating elements 2 is periodically exchanged resulting in making the maintenance operation extremely inefficient.

Moreover, where separated fluid is produced by the above-described processing apparatus, it has been usual that since high-pressure seawater or concentrated water flows through the manifolds 22 and 24, the pressure loss of these manifolds becomes significant causing the load of the related pump or the like to be quite heavy. Consequently, the availability factor of the apparatus as a whole is low and as a result, the method of producing the separated fluid by using such apparatus has been inefficient.

DISCLOSURE OF THE INVENTION

An object of the present invention is to provide an inexpensive apparatus for processing fluid together with its unitary module and a cylindrical vessel forming such unitary module by eliminating the above-described conventional disadvantages and improving the ease of assembly of the apparatus.

Another object of the present invention is to provide an apparatus for processing fluid which does not require any complicated manifolds, together with its unitary module.

Still another object of the present invention is to provide an inexpensive method of producing separated fluid and a fluid processing method by using the above-described apparatus for processing fluid.

One mode of the cylindrical vessel of the present invention is a cylindrical vessel having a plurality of flow ports on the outer peripheral surface thereof at positions near each end of said vessel, respectively, and wherein at least two of said flow ports near one side of said vessel are so provided as to substantially correspond, in position, to the counterparts thereof near the other end of said vessel in the circumferential direction.

Another mode of the cylindrical vessel of the present invention is a cylindrical vessel having a plurality of flow ports on the outer peripheral surface thereof at positions near each end of said vessel, respectively, and wherein each of said flow ports near one end of said vessel substantially corresponds, in position, to the counterparts thereof near the other end of said vessel in the circumferential direction.

One mode of the unitary module for a fluid processing apparatus of the present invention is a unitary module of an apparatus for processing fluid, which contains therein a plurality of separating elements and which is provided with a plurality of flow ports on the outer peripheral surface near each end thereof, respectively.

One mode of the fluid processing apparatus of the present invention is an apparatus for processing fluid comprising a plurality of cylindrical vessels having a flow port on the outer peripheral surface thereof at positions near each end and containing therein a plurality of separating elements arranged substantially parallel to one another within each of said cylindrical vessels, so that said cylindrical vessels are assembled in such a way that flow ports of adjoining vessels are facing to, and connected to, each other.

Another mode of the fluid processing apparatus of the present invention is an apparatus comprising a plurality of cylindrical vessels each containing a plurality of separating elements therein and having a plurality of flow ports formed on the outer peripheral surface thereof at positions near each end of said vessel, wherein said cylindrical vessels are arranged substantially parallel to one another with said flow ports of one of the vessels facing to those of the other and wherein fluid transport pipes intersecting said cylindrical vessels are provided between said cylindrical vessels so as to join with the flow ports near both ends of each of said cylindrical vessels, respectively, and said flow ports and said fluid transport pipes are connected on face-to-face basis with one another.

The flow of fluid to be processed by the fluid processing apparatus using the cylindrical vessels according to the present invention is as follows:

The fluid is supplied into one of the cylindrical vessels from the first flow port near one end of the cylindrical vessel and a part of the fluid is supplied, at a position near that one end, into the first flow port of another cylindrical vessel connected to the second flow port provided for example at a position symmetrical with the first flow port of the first-mentioned cylindrical vessel with respect to the axis of the vessel. At least a remaining fluid is discharged from the third flow port provided at the other end of the cylindrical vessel after flowing through the interior of the cylindrical vessel. In this case, since the fourth flow port is provided near that other end of the vessel especially at substantially the same position as the second flow port in the circumferential direction, if a similar flow port is provided at the other end of the other cylindrical vessel, these two flow ports can be connected so that the fluid is received from the connected flow ports and discharged from the above-mentioned third flow port. It is also possible to allow the fluid to flow into the vessel from the third flow port and to be discharged from the fourth flow port.

Thus, each of the cylindrical vessels has a plurality of flow ports at its inflow-side (one end) and a plurality of flow ports at its discharge-side (the other end) so that the inflow-side flow ports substantially correspond in position to the discharge-side flow ports, respectively, in the circumferential direction. Consequently, a plurality of the cylindrical vessels can be connected to one another at the inflow-sides and the discharge-sides. Of the plurality of cylindrical vessels connected in the above manner, each of those vessels located at the end may be provided with at least two flow ports at which it is connected with the adjoining vessel and also with a third flow port at a position different from the above-mentioned two flow ports so that the fluid may be supplied or discharged therefrom.

The apparatus for processing fluid of the present invention comprises a plurality of cylindrical vessels each provided with flow ports on the outer peripheral surfaces near both ends thereof, respectively, and having a plurality of separating elements disposed therein and is constructed such that the cylindrical vessels are arranged substantially parallel to one another with the flow ports of each adjoining vessels facing to and connected to each other. Consequently, no manifold is required for connecting the flow ports and as a result, it is possible to dispense with the connecting operation by manifolds. Further, since no manifold is provided at the end (bottom surface) of each vessel, it is possible to open the bottom surface of the end portion of the vessel in a simple manner at the time of replacement of the separating elements thereby facilitating the periodical replacement of the separating elements of the apparatus. Further, since the cylindrical vessels are piled one above another, the use of frames which has conventionally been required for placing the cylindrical vessels thereon is no longer necessary and the frame fabricating operation can be eliminated.

One mode of the method for producing separated fluid of the present invention is a method comprising the steps of: supplying fluid to be processed into the fluid processing apparatus for processing fluid described above; and reducing the amount of a component mixed or dissolved in said fluid.

Another mode of the method for producing separated fluid of the present invention is a method comprising the steps of: supplying fluid to be processed into the fluid processing apparatus for processing fluid described above; and enriching a component mixed or dissolved in said fluid.

The method for producing separated fluid of the present invention is capable of minimizing the reduction of productivity due to the lowering of the availability factor following the pressure loss arising from the use of manifolds or replacement of the separating elements, by using an apparatus for processing fluid comprising a plurality of unitary modules connected together through flow ports.

Still another mode of the cylindrical vessel of the present invention is a cylindrical vessel having a permeable membrane dividing the interior of said vessel into a low-pressure side space and a high-pressure side space, a low-pressure side flow port connected to said low-pressure side space and a plurality of high-pressure flow ports formed on the outer peripheral surface of said vessel at positions near both ends thereof, respectively, and connected to said high-pressure side space, at least two of said flow ports near one end of said vessel substantially correspond, in position, to the counterpart thereof near the other end of said vessel in the circumferential direction.

Still another mode of the apparatus for processing fluid of the present invention is an apparatus for processing fluid provided with a plurality of the cylindrical vessels described above which are connected together such that the high-pressure side spaces of said vessels join together through the corresponding high-pressure side flow ports near both ends thereof.

Still another mode of the method for producing separated fluid is a method comprising the steps of: supplying fluid to be processed into the fluid processing apparatus described above from the high-pressure side flow port of the cylindrical vessel and collecting separated fluid separated by said permeable membrane through said low-pressure side flow port.

Still another mode of the method for producing separated fluid of the present invention is a method comprising the steps of: supplying fluid to be processed into the fluid processing apparatus described above through the high-pressure side flow port on one end of the cylindrical vessel, separating a part of said fluid by said permeable membrane and collecting a part of said fluid remained in the high-pressure side space from said high-pressure side flow port on the other end of said cylindrical vessel.

One mode of the fluid processing method of the present invention is a method using a fluid processing apparatus comprising a plurality of unitary modules each in the form of a cylindrical vessel provided with fluid processing elements therein, and a first and a second flow port on the outer peripheral surface thereof at a position near one end of said vessel and also provided with a third and a fourth flow port on the outer peripheral surface thereof at a position near the other end of said vessel so as to substantially correspond, in position, to said first and second flow ports, respectively, in the circumferential direction, said method comprising the steps of: supplying fluid to be processed into one of said cylindrical vessel through said first flow port thereby allowing a part of said fluid to flow into the flow port of another cylindrical vessel through said second flow port; discharging at least a part of the remaining said fluid through said third flow port of said cylindrical vessel after processing it by said fluid processing means within said vessel; and causing fluid to be processed supplied into said cylindrical vessel through said fourth flow port from the flow port of another cylindrical vessel to be discharged through said third flow port via the interior of said cylindrical vessel to thereby obtain a processed fluid.

Another mode of the fluid processing method of the present invention is a method using apparatus comprising a plurality of unitary modules each in the form of a cylindrical vessel provided with fluid processing elements therein, and a first and a second flow port on the outer peripheral surface thereof at a position near one end of said vessel and also provided with a third and a fourth flow port on the outer peripheral surface thereof at a position near the other end of said vessel so as to substantially correspond, in position, to said first and second flow ports, respectively, in the circumferential direction, said method comprising the steps of: supplying fluid to be processed into one of said cylindrical vessels through said first flow port thereby allowing a part of said fluid to flow into the flow port of another cylindrical vessel through said second flow port; discharging at least a part of the remaining part of said fluid through said fourth flow port of said cylindrical vessel after processing it by said fluid processing means within said vessel; and causing fluid to be processed supplied into said cylindrical vessel through said third flow port from the flow port of another cylindrical vessel to be discharged through said fourth flow port via the interior of said cylindrical vessel to thereby obtain a processed fluid.

Still another mode of the cylindrical vessel of the present invention is a cylindrical vessel provided with first, second and third flow ports on the outer peripheral surface thereof such that said first flow port is provided at a position near one end of said cylindrical vessel, said second flow port is provided at a position near the other end of said cylindrical vessel so as to correspond, in position, to said first flow port in the circumferential direction and said third flow port is provided at a position not corresponding to said first and second flow ports in the circumferential direction of said vessel.

BRIEF DESCRIPTION OF THE DRAWINGS

FIGS. 4(A) and 4(B) are side views of the apparatus for processing fluid shown in FIG. 3, the views illustrating different modes of the apparatus, respectively.

Figure 1:
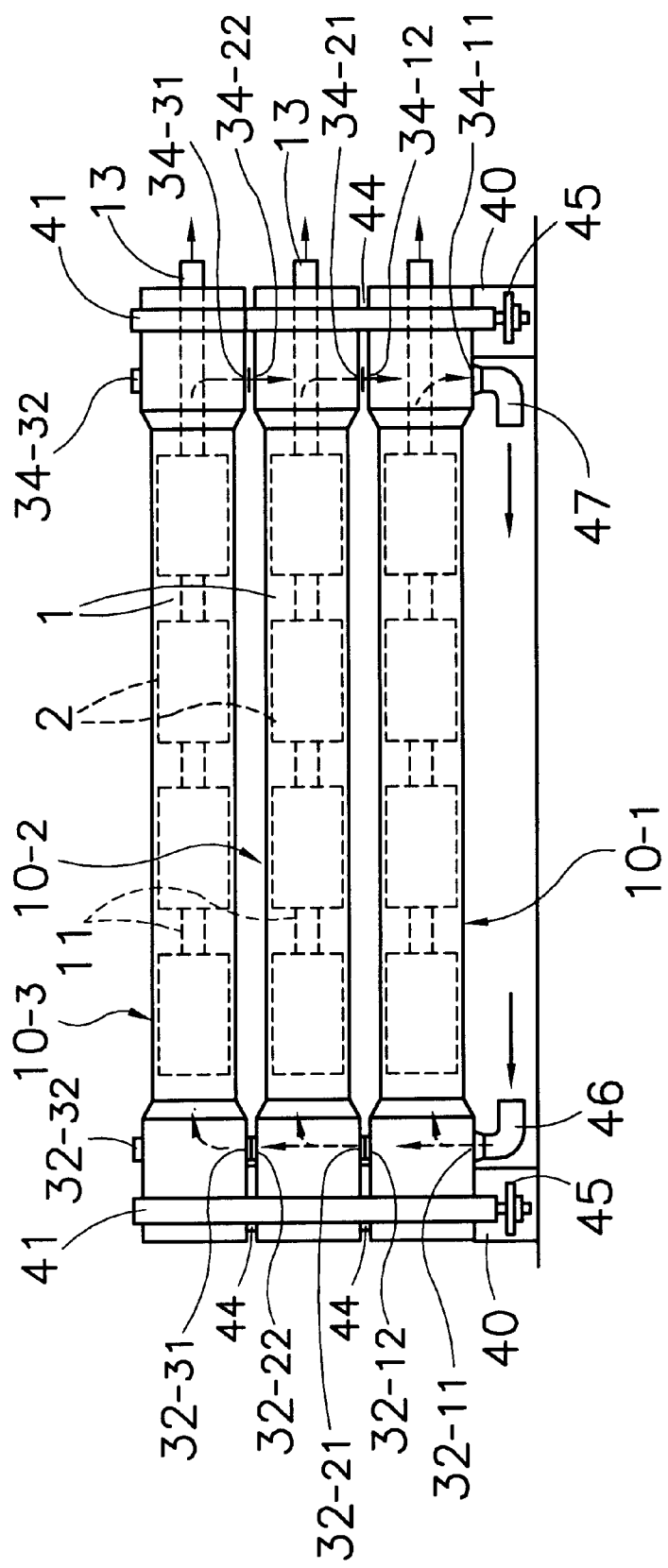
FIG. 1 is a front view of an apparatus for processing fluid according to one embodiment of the present invention.

Note that the symbols in the drawings represent the following:

| 1: | Cylindrical vessel, | 2: | Separating element |
|---|---|---|---|
| 10: | Unitary module | 15: | Liquid transport pipe |
| 15a: | (Cross) connecting pipe | | |
| 15b: | (Linear) connecting pipe | | |
| 32, 34: | Flow ports | | |
| 40: | Base | 41: | Belt |
| 42: | O-ring | | |
| 46: | Supply pipe | 47: | Discharge pipe |
| 45: | Flat flange | | |

BEST MODE FOR CARRYING OUT THE INVENTION

Figure 2:
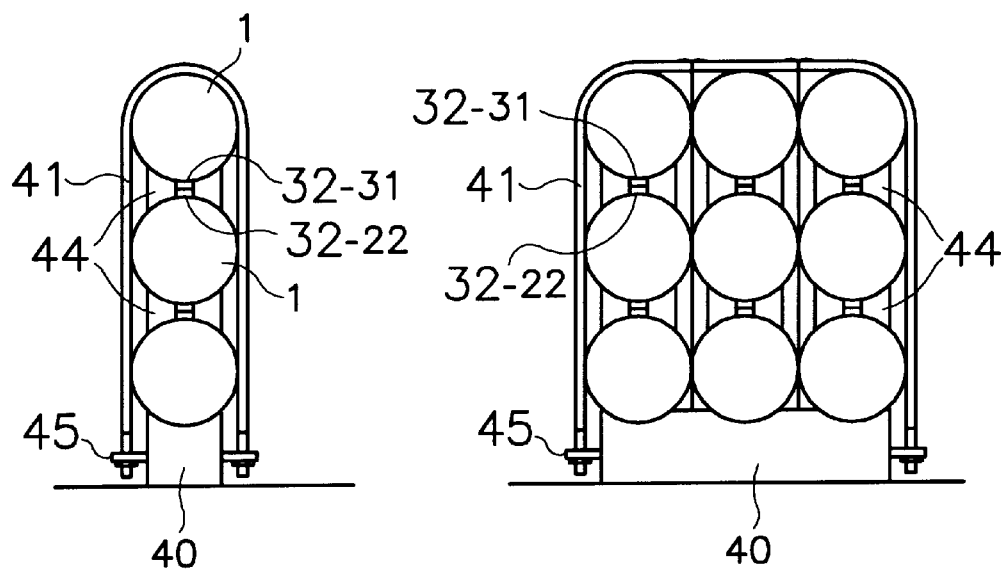
FIGS. 2(A) and 2(B) are side views of the apparatus for processing fluid shown in FIG. 1, the views illustrating different modes of the apparatus, respectively.

FIGS. 1 and 2 show an apparatus for processing fluid according to one embodiment of the present invention.

This fluid processing apparatus comprises a plurality of unitary modules 10-1, 10-2 and 10-3 which are laid one above another in substantially parallel relationships with one another with both ends thereof joined together. Each of the unitary modules 10 is in the form of a cylindrical vessel 1 and has both end portions thereof made larger in diameter than the intermediate portion as a main body portion thereof. Further, inside the unitary module 10, there are situated a plurality of separating elements 2 arranged in series with one another. On the outer peripheral surfaces of the larger-diameter end portions of the unitary module there are provided two pairs of vertically opposing flow ports 32-11, 32-12 and flow ports 34-11, 34-12, respectively, situated symmetrically (In the case where the number of the flow ports is two, as shown in the schematic, they are situated at vertically opposing positions), with respect to the axis of the vessel so as to slightly projecting outside from the outer peripheral thus constructed surfaces.

As the separating element 2 situated in the cylindrical vessel 1, a known one may be used and usually, it is one formed by spirally winding a permeable membrane around a central pipe with a spacer between successive turns of the membrane.

The plurality of unitary modules 10-1, 10-2 and 10-3 thus constructed are arranged horizontally one above another in sequence through spacers 44 and sealing members (not shown) such as O-rings in such a manner that both ends of the lowest unitary module (10-1) are laid on a base plate 40 and the flow ports of the adjoining vessels on both ends thereof are connected together, respectively. Further, belts 41 are passed around both end portions of the piled unitary modules, respectively, which are fastened to flanges 45, 45 projecting from the side surfaces of the base plate 40 with bolts and nuts.

Where the plurality of unitary modules 10 are piled and fastened with the belts 41, they may be fastened every single row as shown in FIG. 2(A) or every plurality of rows as shown in FIG. 2 (B). The fastening means is not limited to the belts and so it is of course possible to use other means such as a combination of elongated bolts and nuts.

The flow of fluid through the above-described arrangement is as follows:

When when fluid to be processed is supplied in the direction of the arrow from the inflow-side flow port 32-11 of the first cylindrical vessel 10-1 via the supply pipe 46. Part of the fluid flows into the second cylindrical vessel 10-2 from the inflow-side flow ports 32-12 through the inflow-side flow port 32-21 connected thereto and the remaining part of the fluid flows through the first cylindrical vessel 10-1. It is processed by all of the separating elements 2 until it is discharged from the discharge-side flow port 34-11. The fluid that entered the second cylindrical vessel 10-2 is further diverged and a part thereof flows into the third cylindrical vessel from the second inflow-side flow port 32-22 through the inflow-side flow port 32-31 connected thereto so as to be processed by the separating elements 2 and then returns to the second cylindrical vessel from the discharge-side flow port 34-31 through the second discharge-side flow port 34-22 connected thereto. The fluid that flowed through the second cylindrical vessel while it was processed by the separating elements returns to the first cylindrical vessel from the second discharge-side flow port 34-21 via the first discharge-side flow port 34-12 so as to be finally discharged from the discharge-side flow port 34-11 as it is.

In the above arrangement, the circumferential position of the flow port 32-11 connected to the supply pipe 46 of the first cylindrical vessel 10-1 and that of the flow port 34-11 connected to the discharge pipe 47 are not always required to coincide with each other.

Figure 3:
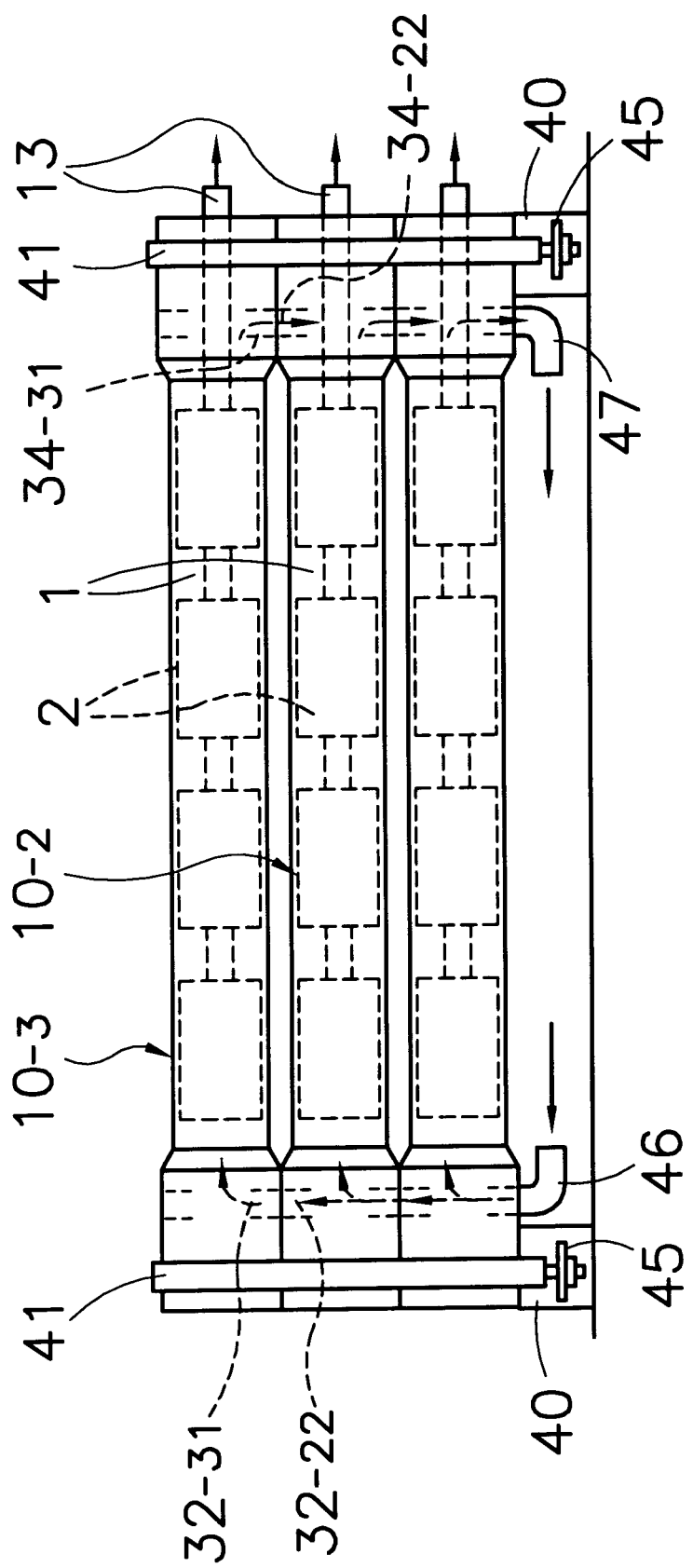
FIG. 3 is a front view of an apparatus for processing fluid according to another embodiment of the present invention.

FIGS. 3 and 4 show another embodiment of the present invention.

The apparatus for processing fluid in the instant embodiment differs from the above-described embodiment with respect to the point that unlike the previous embodiment, the flow ports 32 and 34 formed on the outer peripheral surfaces of both end portions of the cylindrical vessel 1 do not project outside the peripheral surfaces. Thus, by forming the flow ports 32 and 34 just on the wall of the vessel, the spaces 44 can be dispensed with. Further, in order to stabilize the piled-up cylindrical vessels, the outer peripheral surfaces of both ends of adjoining cylindrical vessels which come into contact with each other are made substantially flat.

In the instant embodiment, too, where the cylindrical vessels 1 piled one above another in a plurality of stages are fastened together by means of the belts 41 at both ends thereof, respectively, the vessels may be fastened every one row as shown in FIG. 4(A) or every plurality of rows as shown in FIG. 4(B).

Figure 5:
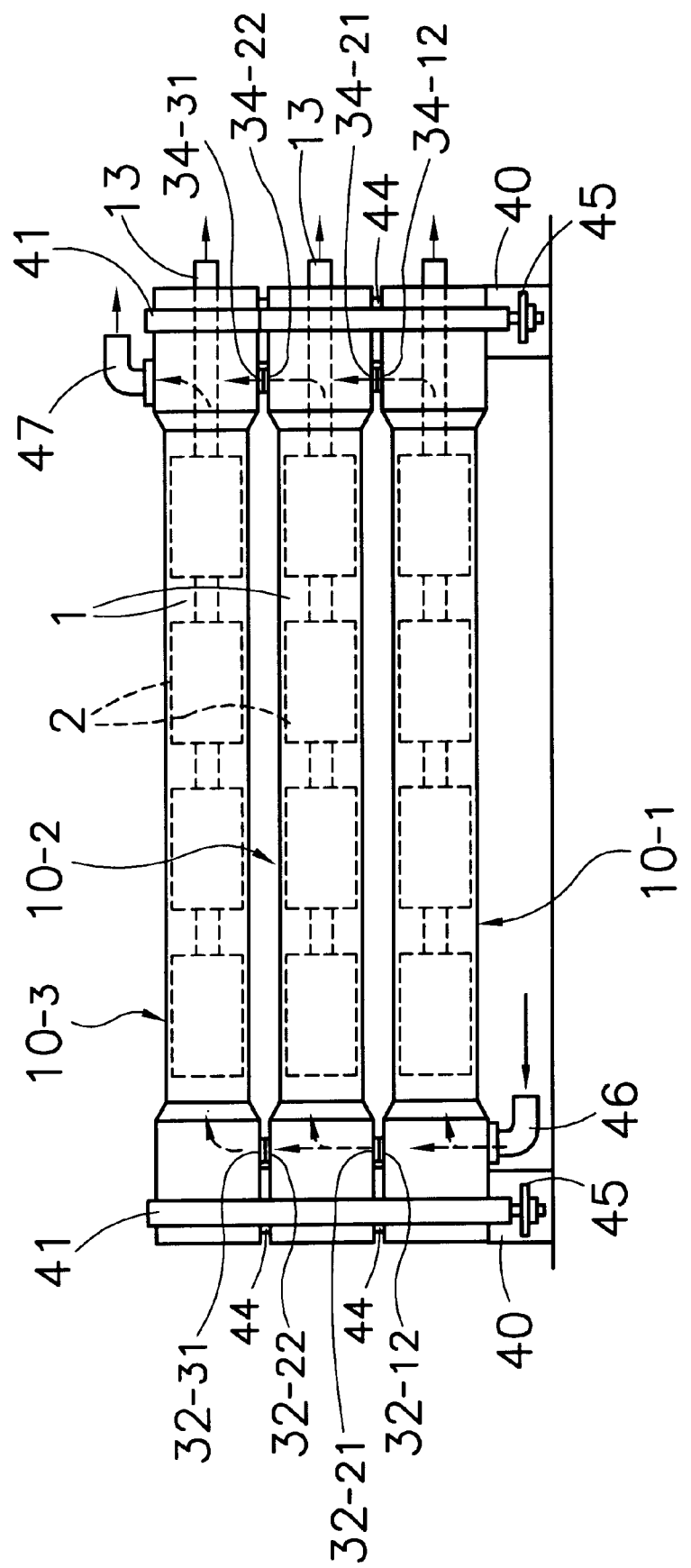
FIG. 5 is a front view of an apparatus for processing fluid according to still another embodiment of the present invention.

The fluid processing apparatus according to the embodiments is generally constructed such that the liquid supply pipe 46 is connected to the lower-side flow port 32 of the lowermost unitary module 10 and the discharge pipe 47 is connected to the flow port 34. Further, the upper-side flow ports 32 and 34 of the uppermost unitary module are plugged up by stoppers, respectively. Of course, there is a case where the uppermost and lowermost unitary modules 10 can be devoid of any flow ports on the side where they are not connected to other unitary modules (for example, the uppermost unitary module in FIG. 3) or a case where it is enough for each of them to have only one flow port (for example, the uppermost and lowermost unitary modules in FIG. 5).

Figure 6:
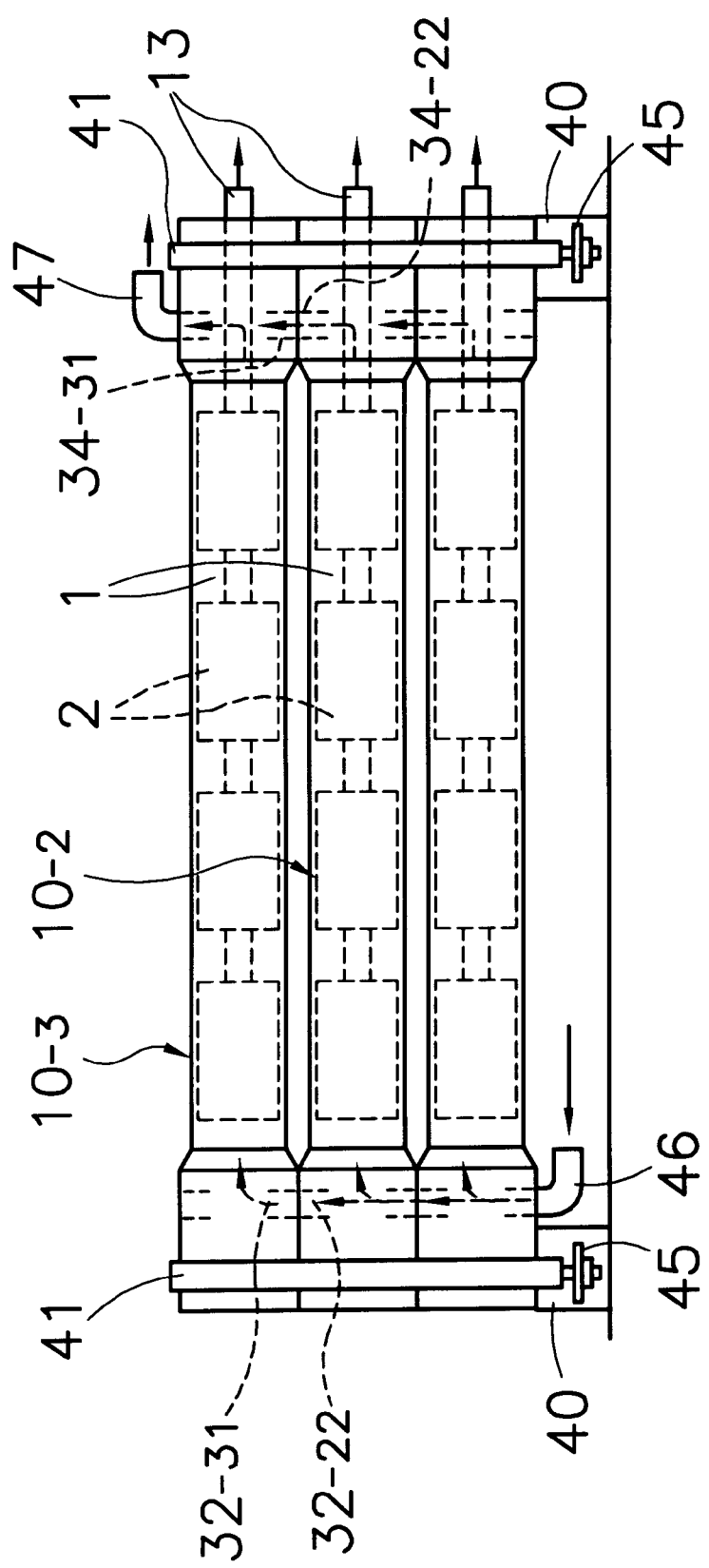
FIG. 6 is a front view of an apparatus for processing fluid according to further another embodiment of the present invention.
Figure 7:
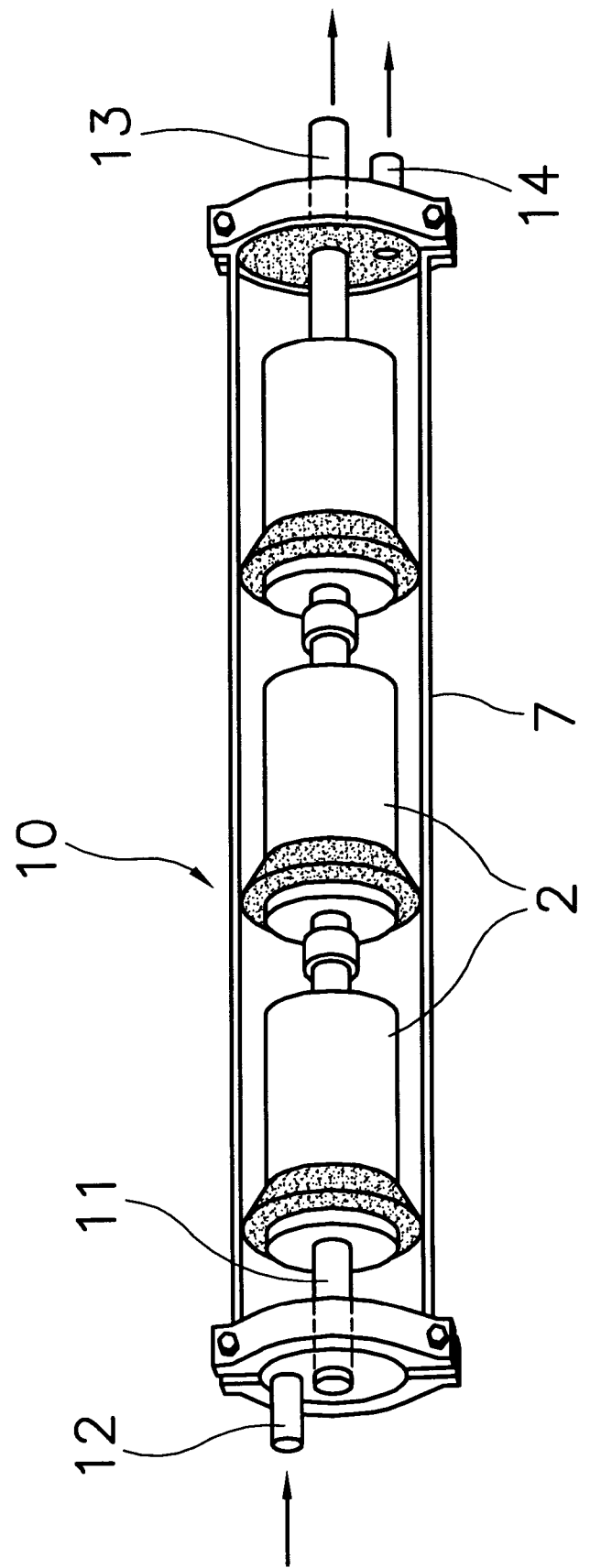
FIG. 7 is a schematic external view of a unitary module for use with a conventional fluid processing apparatus.
Figure 8:
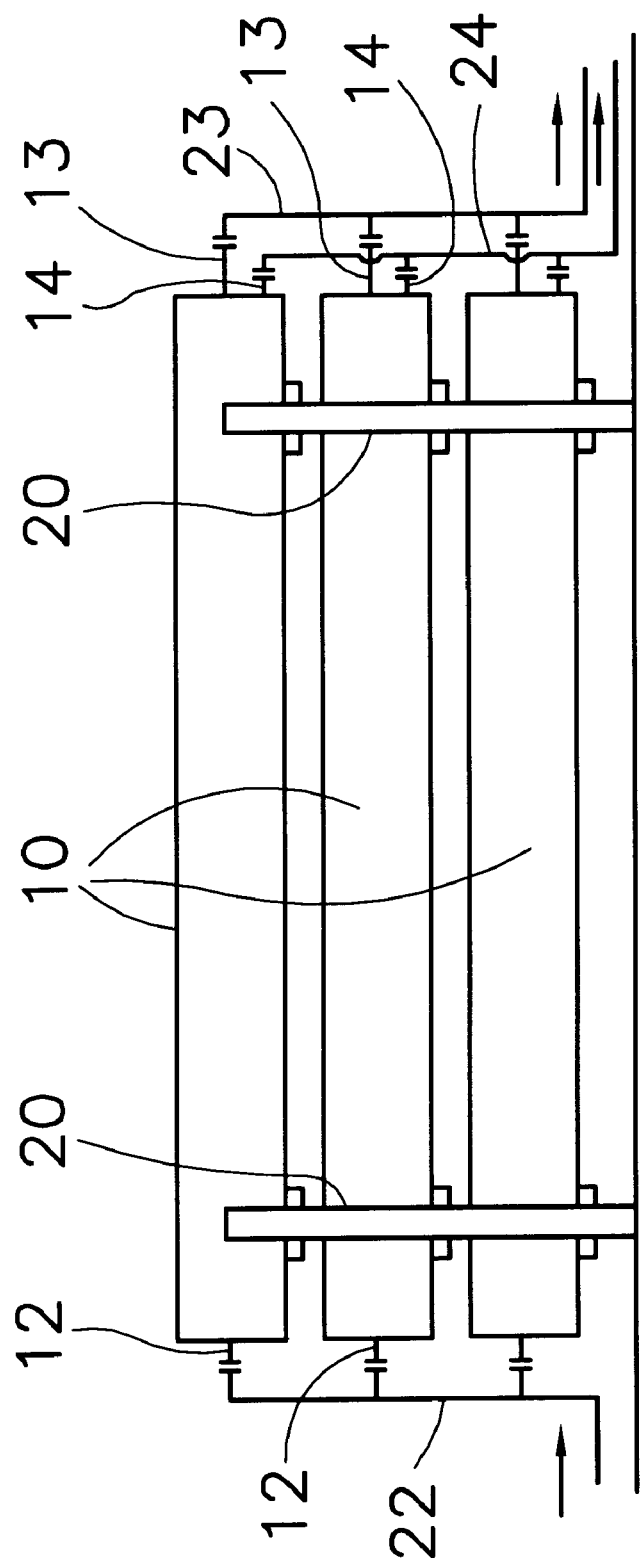
FIG. 8 is a schematic front view of a conventional fluid processing apparatus.

The supply pipe 46 and discharge pipe 47 are not always required to be connected to the flow ports 32 and 34 on the lower-side of the lowermost unitary module 10 as shown in FIG. 1. For example, as in the case of the embodiment shown in FIGS. 5 and 6, the discharge pipe 47 may be mounted to the flow port 34 on the upper-side of the uppermost unitary module 10 so that the discharge pipe 47 becomes diagonal with the supply pipe 46 provided on the lowermost unitary module 10. The flow of the fluid in that case will be such that the direction of flow of the fluid in the discharge-side flow port in the FIG. 1 embodiment is reversed. Therefore, all the fluid passes through the connected portions among the cylindrical vessels twice and through the vessels once thereby making the resistance of the fluid uniform. Thus, by arranging the supply pipe 46 and the discharge pipe 47 in diagonal relationship with each other, it is possible to make uniform the distribution of the pressure loss of the fluid within the processing apparatus to thereby enable even distribution of the fluid. Further, with this structure containing the plurality of cylindrical vessels, those located at the upper and lower- sides (i.e., 10-1 and 10-3) may well have at least one flow port which connects the supply pipe 46 or the discharge pipe 47. If the position of such third flow ports in the circumferential direction differs from that of the flow port to be connected to the adjoining vessel, both of the upper and lower-side vessels may have the same length as other vessels without situating adjoining vessels far away from each other.

Fluid separation using the fluid processing apparatus of the above-mentioned embodiments is performed by supplying the fluid to be processed under pressure from the supply pipe 46. The pressurized fluid is distributed into each of the unitary modules 10 via the connected portions among the flow ports 32, 32. The fluid thus distributed has unnecessary components mixed or dissolved therein separated therefrom by the separating elements 2 and the low-pressure fluid (fresh water in the case of a seawater desalinating apparatus) after such separation is discharged from the discharge pipe 13 via the central pipe 11 while the concentrated fluid is discharged from the discharge pipe 47 via the connecting portions among the flow ports 34, 34.

According to the above-described fluid processing apparatus of the present embodiment, the plurality of unitary modules 10 are piled one above another with the lower unitary modules directly supporting the upper unitary modules, respectively, so that support frames which have been used for mounting the unitary modules of the conventional fluid processing apparatus are no longer required. Further, as the flow ports 32 and 34 are facing to, and directly connected to each other, respectively, no manifolds are required. Even where a manifold has to be used, it is used only for connecting together the discharge pipes 13 for discharging the low-pressure fluid. Thus, since a manifold is used only at one side end of each of the unitary modules 10, it is not necessary to dismantle and remove the manifold at the time of periodic replacement of the separating elements.

It should be noted that although in the above-described embodiment, each of the unitary modules have two flow ports on both ends thereof, it may be provided with any number of circulating ports. For example, it is preferable that the four flow ports of each of the unitary modules be so formed as to open in directions intersecting at right angles to the axis of each unitary module. It is also preferred that the unitary modules are piled one above another as shown in FIG. 2(B) or 4(B) so that they are connected together not only vertically but also horizontally. This preferred embodiment further reduces the pressure loss in the fluid processing apparatus.

Further, it is not necessary that each unitary module should have the same number of flow ports on both ends thereof. For example, in FIG. 5, the outermost vessel which is connected with the inlet port or discharge port for the fluid may be provided at one end thereof with flow ports larger in number (for example, two or three) than those at the other end thereof.

Accordingly, the unitary modules 10 are directly supported from below so that support frames which have conventionally been used substantially are substantially not required. Further, as the unitary modules are connected to each other with the flow ports 32 and 34 aligned with each other, no manifold is required. Even if a manifold is used, it is only used for connecting the discharge pipes 13 for discharging a low-pressure fluid. Thus, any such manifold is used only on one side end of each unitary module 10 so that periodic replacement of separating elements is facilitated.

It should be noted that although in the above-described embodiments bolts 38 and nuts 39 are used for fastening a plurality of unitary modules 10, the present invention is not limited thereto and other means such as passing of belts around both ends of the unitary module assembly may be used.

Figure 9:
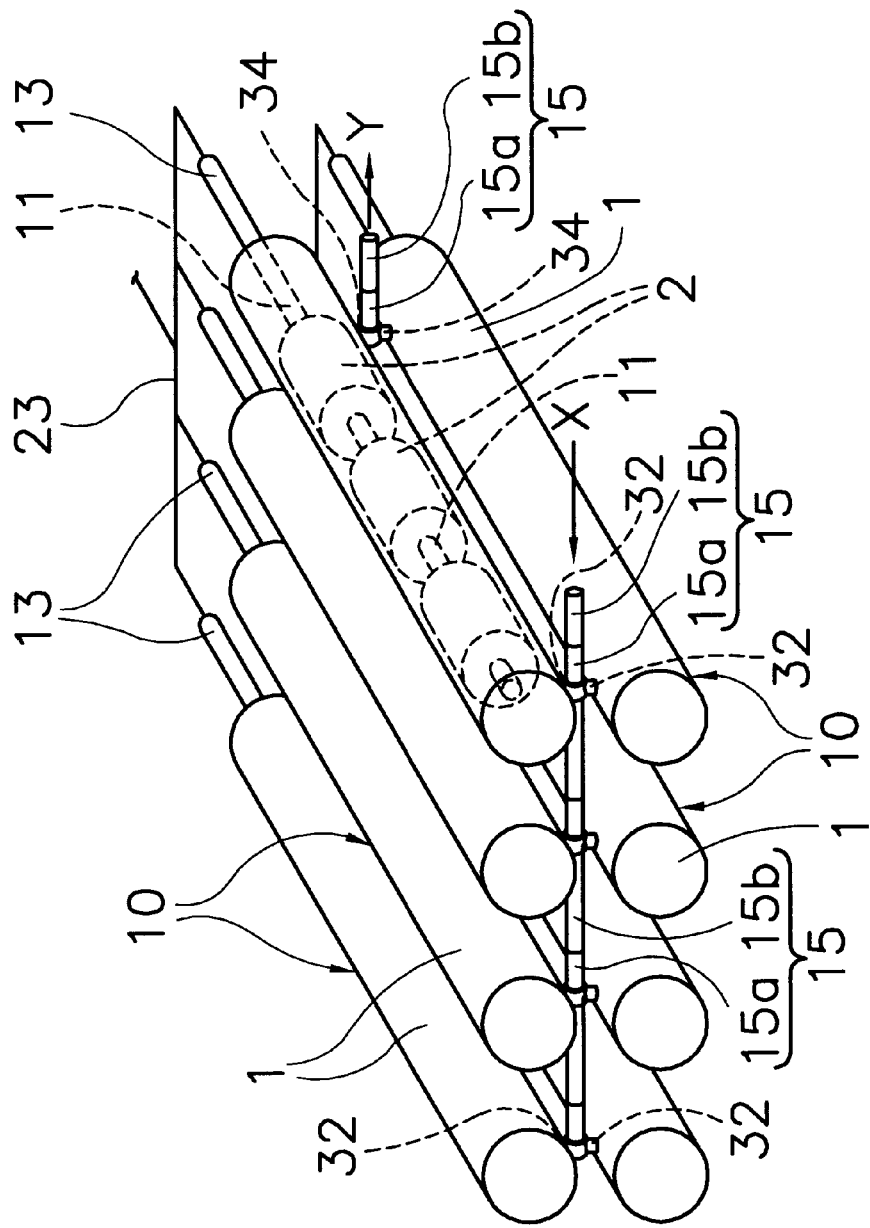
FIG. 9 is a schematic perspective view of an apparatus for processing fluid according to a still further embodiment of the present invention.

In FIGS. 9 and 10, there is shown an apparatus for processing fluid according to still another embodiment of the present invention.

This apparatus for processing fluid includes a plurality of unitary modules 10 arranged horizontally and vertically in parallel relationships with one another. Further, between both ends of the upper and lower rows of the unitary modules 10 there are sandwiched fluid transport pipes 15, 15, respectively, which run perpendicularly across the rows of unitary modules. Each of the transport pipes 15 comprises combinations of cross-connecting pipes 15a and linear connecting pipes 15b.

Each of the unitary modules 10, which are cylindrical vessels 1, contains therein a plurality of separating elements 2 in series and with flow ports 32 and 34 near both end portions, respectively, which project outwardly of the outer peripheral surfaces of both end portions. The unitary modules 10 arranged vertically in two rows have the flow ports 32 and 34 thereof aligned with one another, respectively, so that the flow ports 32, 32 and 34, 34 are connected together by means of cross-connecting pipes 15a, 15a which are then connected together by means of linear connecting pipes 15b.

For the separating elements 2 situated in each of the cylindrical vessels 1, the known ones may be used and generally, each of the separating elements 2 comprises a permeable membrane wound around a central pipe with a spacer between successive turns of the membrane.

Figure 10A:
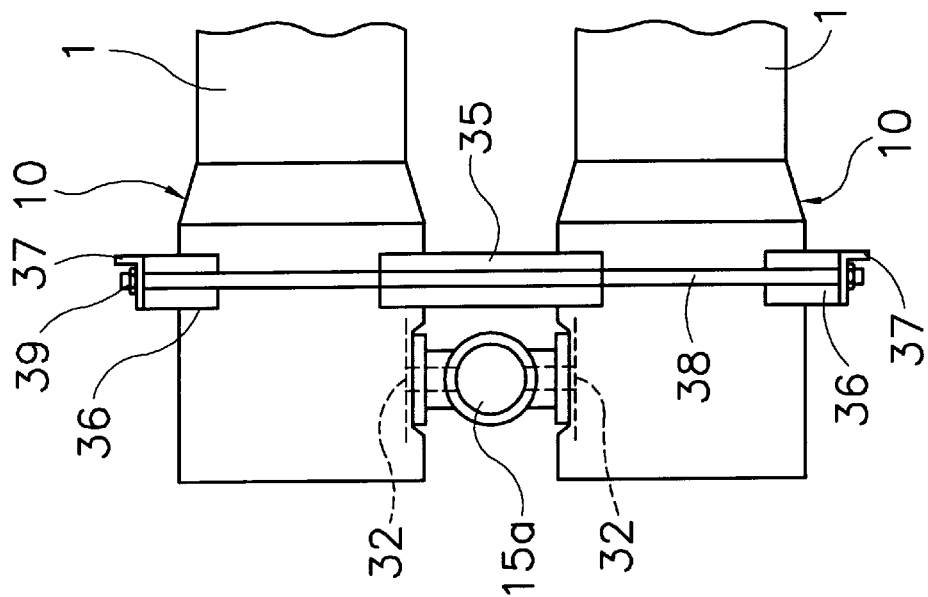
FIG. 10(A) is a side view of one end of each of unitary modules of the apparatus shown in FIG. 9
Figure 10B:
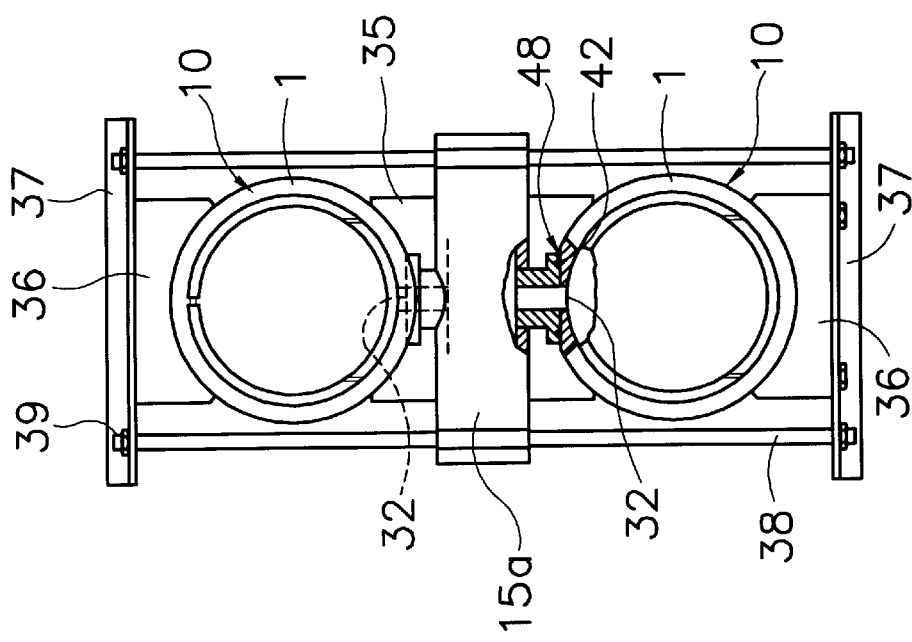
FIG. 10(B) is a front view of the same.

As shown in FIGS. 10(A) and 10(B), the vertically arranged unitary modules 10, 10 have their flow ports 32, 32 opposite to each other and connected together by means of the cross-connecting pipe 15a. The mode of connection of the flow ports 32, 32 and the cross-connecting pipe 15a is such that the sides of the outer peripheral surfaces of the unitary modules 10, 10 at which the flow ports 32, 32 are provided are made flat so as to intersect at substantially right angles with the circulating direction of the fluid to be processed while both end faces of the connecting pipe 15a are attached with flat flanges 48, respectively, so that the flattened portion around each of the flow ports 32 and each of flat flanges 48 are connected on face-to-face basis through an O-ring 42.

Further, a spacer 35 is interposed between both adjoining ends of the unitary modules 10, 10 and other spacers 36, 36 and angular members 37, 37 are respectively applied to the outer sides of the above-mentioned adjoining ends, so that the unitary modules 10, 10 are held fixed by fastening bolts 38 interposed between the angular members 37, 37 by means of nuts 39.

The connection on face-to-face basis and fastening structure between the flow port 32 and the connecting pipe 15a also apply to a case with the flow ports 34, 34 at the opposite side ends of the unitary modules 10, 10.

Where the flow port and connecting pipe are surface-connected as described above, even when the central axis of the flow port and that of the connecting pipe do not coincide with each other due to a manufacturing error of the unitary module or an assembling error of the apparatus for processing fluid, they can be connected without any trouble as far as such inconformity is within the range of wideness of the flattened portions of the two. In this case, the connection of the flow port and the opening of the connecting pipe is made between the two flat surfaces so that the central axes of the two may be shifted from each other in any direction within a plane intersecting at a right angle with the axes. Any axial dislocation between the two may be compensated for within the range of sealing capacity of the sealing member determined by the elastic deformation characteristic of the sealing member. Thus, by using such a flat-to-flat connection, it is possible to reduce the flow resistance of the fluid to be processed by enlarging the diameter of the flow port or the opening of the connecting pipe thereby allowing a larger amount of the fluid to be processed and also to enlarge the range of compensation of the dislocation between the central axes of the flow port and the connecting pipe.

Further, although, in the above-described embodiment, the end surface of the flow port of each unitary module and the open end of the connecting pipe are connected flat-to-flat, both of them may be connected, for example, in a manner of cylinder-like surface. This is accomplished in such a manner that for example, the side surface of the unitary module is made circular and the open end surface of the connecting pipe is attached with a flange having a surface mated with the circular side surface of the unitary module so that both surfaces are connected together through a sealing member.

However, in the above case, the dislocation between the axis of the flow port and the axis of the connecting pipe can be compensated for in the above-described manner with respect to the axial component of the circular surface but it is hard to be compensated for in a direction intersecting at right angles with the axes of the two. However, it is easier to machine the end surface of the flow port of the unitary module circular than to machine it flat and it is satisfactory, in many cases, because the axial dislocation of the unitary module mainly due to the manufacturing error of the unitary module can be compensated for by this method.

Further, there may be also a method in which a joint of complicated structure is embedded in the flow port of the unitary module and such a joint is provided in the opening of the connecting pipe thereby connecting the flow port and the connecting pipe but this method has the disadvantage that the compensation range for the dislocation between the axes of the flow port and the connecting pipe is small, and the diameter of the flow port can not be made large due to the greater cost of a large-diameter joint, which results in increasing the flow resistance of the fluid. Furthermore, in order to embed such joint in the flow port, a sealing structure is needed for the joint-embedding portion resulting in making the entire module extremely complicated.

The separating process using the apparatus for processing fluid of the present embodiment described above is performed by supplying a pressurized unprocessed fluid into the apparatus from one of the fluid transport pipes 15 as indicated by the arrow X. The pressurized fluid is then distributed into each of the unitary modules 10 through the connected portion of the flow ports 32, 32. This fluid is filtered in each unitary module by the separating elements 2 so that any unnecessary or effective component mixed or dissolved in the fluid is separated, then the separated fluid is discharged from the discharge pipe 13 via the central pipe 11 and the separated concentrated fluid is discharged in the direction of the arrow Y from the other fluid transport pipe 15 via the connected portion of the flow ports 34, 34.

Industrial Applicability

The apparatus for processing fluid of the present invention can be used as, besides a seawater desalination apparatus, a brackish water desalination apparatus or system, a river water or city water purification apparatus, an apparatus for reducing or removing unnecessary components in a fluid and an effective component concentration apparatus such as a concentration apparatus for drinks such as juices, soups or the like or the essence of silkworm chrysalides for a bait of fishing. Further, it is also used as an oxygen enriching or reduction apparatus, an apparatus for removing dust in the air or an apparatus for removing unnecessary components in a gas.

We claim:

1. An apparatus for processing fluid comprising a plurality of unitary modules arranged substantially parallel to one another; a flow port defined on the outer peripheral surface of each of said unitary modules at positions near each end, and a separating element arranged within each of said unitary modules, wherein said unitary modules are assembled to from said fluid processing apparatus in such a way that flow ports of adjoining unitary modules are facing toward and connected to each other, and wherein at least one of said unitary modules is further provided with a retentate fluid discharge port, and each said plurality of modules is provided with a permeate discharge port.

2. The apparatus for processing fluid according to claim 1, wherein each of said separating elements is formed such that a permeable membrane is spirally wound around a tubular member with a spacer inbetween.

3. An apparatus for processing fluid comprising a plurality of unitary modules; a plurality of separating elements mounted within each of said unitary modules and a plurality of flow ports formed on the outer peripheral surface of each of said unitary modules at positions near each end of said modules, wherein said unitary modules are arranged substantially parallel to one another with said flow ports of at least one of the modules facing to those of an adjacent module and wherein fluid transport pipes extending between said unitary modules join with the flow ports near both ends of at least some of said unitary modules, respectively, and said flow ports and said fluid transport pipes are connected on face-to-face basis with one another.

4. The apparatus for processing fluid according to claim 3, wherein each of said separating elements is formed such that a permeable membrane is spirally wound around a tubular member with a spacer inbetween.

5. The apparatus for processing fluid according to claim 3 or 4, wherein a fluid transport pipe arranged near one end of said unitary modules serves as a supply pipe and a fluid transport pipe arranged near the other end of said unitary modules serves as a discharge pipe.

6. A method for producing separated fluid comprising the steps of:
supplying fluid to be processed into the apparatus for processing fluid described in claims 1 or 3; and
reducing the amount of a component mixed or dissolved in said fluid.

7. A method for producing separated fluid comprising the steps of:
supplying fluid to be processed into the apparatus for processing fluid described in claims 1 or 3; and
enriching a component mixed or dissolved in said fluid.

8. A unitary module adapted for use in an apparatus for processing fluid, said module comprising a permeable membrane dividing the interior of said module into a low-pressure side space and a high-pressure side space, a low-pressure side flow port connected to said low-pressure side space and a plurality of high-pressure side flow ports formed on the outer peripheral surface of said module at positions near both ends thereof, respectively, and connected to said high-pressure side space, wherein at least two of said high-pressure side flow ports near one end of said module substantially correspond, in position, to the counterpart thereof near the other end of said module in the circumferential direction.

9. The unitary module according to claim 8, wherein said permeable membrane is detachable from the body of said unitary module.

10. An apparatus for processing fluid provided with a plurality of the unitary modules described in claim 8 or 9 which are connected together such that the high-pressure side spaces of said modules join together through the corresponding high-pressure side flow ports near both ends thereof.

11. A method for producing separated fluid comprising the steps of: supplying fluid to be processed into the apparatus for processing fluid described in claim 10 from the high-pressure side flow port of said unitary module and collecting separated fluid separated by said permeable membrane through said low-pressure side flow port.

12. A method for producing separated fluid comprising the steps of:
supplying fluid to be processed into the apparatus for processing fluid described in claim 10 through the high-pressure side flow port on one end of one of the unitary modules, separating a part of said fluid by said permeable membrane and collecting a part of said fluid remaining in the high-pressure side space from said high-pressure side flow port on the other end of said unitary module.

13. A fluid processing method using an apparatus for processing fluid comprising a plurality of unitary modules each in the form of a cylindrical vessels provided with fluid processing means therein, and each having a first and a second flow port on the outer peripheral surface of said vessels at a position near one end of said vessels and each also being provided with a third and a fourth flow port on the outer peripheral surface of said vessels at a position near the other end of said vessels so as to substantially correspond, in position, to said first and second flow ports, respectively, in the circumferential direction, said method comprising the steps of:
supplying fluid to be processed into one of said cylindrical vessels through said first flow port thereby allowing a part of said fluid to flow into the flow port of another cylindrical vessels through said second flow port;
discharging at least a part of the remaining part of said fluid through said third flow port of said cylindrical vessels after processing it by said fluid processing means within said vessels; and
causing fluid to be supplied into said cylindrical vessels through said fourth flow port from the flow port of another cylindrical vessels to be discharged through said third flow port via the interior of said cylindrical vessels to thereby obtain a processed fluid.

14. A fluid processing method using an apparatus for processing fluid comprising a plurality of unitary modules each in the form of a cylindrical vessel provided with fluid processing means therein, and each having a first and a second flow port on the outer peripheral surface of said vessel at a position near one end of said vessel and each also being provided with a third and a fourth flow port on the outer peripheral surface of said vessel at a position near the other end of said vessel so as to substantially correspond, in position, to said first and second flow ports, respectively, in the circumferential direction, said method comprising the steps of:
supplying fluid to be processed into one of said cylindrical vessels through said first flow port thereby allowing a part of said fluid to flow into the flow port of another cylindrical vessel through said second flow port;
discharging at least a part of the remaining part of said fluid through said fourth flow port of said cylindrical vessel after processing it by said fluid processing means within said vessel; and
causing fluid to be processed supplied into said cylindrical vessel through said third flow port from the flow port of another cylindrical vessel to be discharged through said fourth flow port via the interior of said cylindrical vessel to thereby obtain a processed fluid.

15. The fluid processing method according to claim 13 or 14, wherein said fluid processing means comprises a permeable membrane and said processed fluid comprises a fluid which has passed said permeable membrane.

* * * * *